(12) United States Patent
Toal et al.

(10) Patent No.: US 11,085,485 B1
(45) Date of Patent: Aug. 10, 2021

(54) METHOD OF INSTALLING A FASTENER INTO A SURFACE AND A WASHER FOR USE THEREWITH

(71) Applicant: Short Run Pro, LLC, Belmont, NC (US)

(72) Inventors: Scott R. Toal, Charlotte, NC (US); Samual W. Schwartz, Charlotte, NC (US); Daniel L. Lee, Belmont, NC (US); Catherine R. Morgan, Belmont, NC (US)

(73) Assignee: Short Run Pro, LLC, Belmont, NC (US)

( * ) Notice: Subject to any disclaimer, the term of this patent is extended or adjusted under 35 U.S.C. 154(b) by 288 days.

(21) Appl. No.: 16/052,573

(22) Filed: Aug. 1, 2018

Related U.S. Application Data (60) Provisional application No. 62/542,861, filed on Aug. 9, 2017.

(51) Int. Cl.
    *F16B 43/00*     (2006.01)
    *F16B 29/00*     (2006.01)
    *B29C 65/00*     (2006.01)

(52) U.S. Cl.
    CPC .......... *F16B 43/003* (2013.01); *B29C 66/006* (2013.01); *F16B 29/00* (2013.01)

(58) Field of Classification Search
    CPC ... B29C 66/006; B29C 66/003; B29C 66/004; B29C 66/348; F16B 43/003; F16B 29/00
    See application file for complete search history.

(56) References Cited

U.S. PATENT DOCUMENTS

| | | | |
|---|---|---|---|
| 1,425,182 A | 8/1922 | Dubbs | |
| 3,153,974 A | 10/1964 | Canning | |
| 3,469,492 A * | 9/1969 | Dahl | F16B 31/028 411/11 |
| 3,842,945 A * | 10/1974 | Potter | B64C 27/51 188/268 |
| 3,948,141 A | 4/1976 | Shinjo | |

(Continued)

FOREIGN PATENT DOCUMENTS

KR     20150135982 A    *   12/2015

OTHER PUBLICATIONS

Lin, Min Jae, KR 2015 0135982 A1 Machine translation (Year: 2015).*

(Continued)

*Primary Examiner* — Lee A Holly
(74) *Attorney, Agent, or Firm* — Nelson Mullins Riley & Scarborough LLP (57) ABSTRACT

A method of installing a fastener into a surface without defacement of the surface utilizes an annular washer of a viscoelastic material placed about the shank of the fastener such that, upon driving the fastener into the surface via a driving tool, the fastener head clamps against the washer to cause it to viscoelastically expand radially outwardly from the fastener shank until the inner opening of the washer expands to approximately the diametric dimension of the enlarged head of the fastener, whereupon the washer can be removed from the fastener. The interposition of the washer between the driving tool and the surface protects the surface against defacement.

16 Claims, 6 Drawing Sheets (56) References Cited

U.S. PATENT DOCUMENTS

| | | | | |
|---|---|---|---|---|
| 4,988,246 | A | * | 1/1991 | Yoshida .............. F16B 31/028 |
| | | | | 116/DIG. 34 |
| 5,188,494 | A | | 2/1993 | Hatin |
| 5,927,918 | A | | 7/1999 | Burger |
| 9,574,597 | B2 | | 2/2017 | Matteson et al. |
| 2004/0105735 | A1 | | 6/2004 | Favre-Bulle et al. |
| 2009/0213535 | A1 | * | 8/2009 | Zhang ................. G11B 33/124 |
| | | | | 361/679.31 |
| 2009/0311066 | A1 | | 12/2009 | Utille |

OTHER PUBLICATIONS

"Uxcell Silicone Water Pipe Connector Seal Ring Gasket Washer 18×8×2.5mm 40pcs" webpage, accessed on Jul. 11, 2017 from website https://www.amazon.com/uxcell-Silicone-Connector-Gasket-18×8×2-5mm/dp/B01DKKR3XI/ref=sr_1_1?ie=UTF8&qid=1533068134&sr=8-1&keywords=uxcell+Silicone+Water+Pipe+Connector+Seal+Ring+Gasket+Washer+18×8×2.5mm+40pcs, all enclosed pages cited.

\* cited by examiner

METHOD OF INSTALLING A FASTENER INTO A SURFACE AND A WASHER FOR USE THEREWITH

FIELD OF THE INVENTION

The present invention relates generally to fasteners, and more particularly to methods of installation thereof, especially so as to prevent defacement of a surface into which a fastener is driven.

BACKGROUND OF THE INVENTION

Fasteners, such as screws, bolts, nails, rivets and the like, are in widespread common use in diverse industries for attaching various items and structures together. Typically, powered tools are used to drive fasteners into place, particularly in commercial jobs in which speed and efficiency are desirable, but hand tools can also be utilized in many applications. However, in certain installations, for example but not limited to finish carpentry and the like, it is important to take care in the use of drive tools to avoid the possibility of defacing or even damaging an exposed surface into which a fastener is driven, particularly for example decorative surfaces such as fascia members. Various means may be utilized, requiring differing levels of skill and with varying effectiveness, to prevent surface defacement or damage in such cases. For example, protective material may be placed on the forward part of a powered tool and/or on the head of the fastener, or fasteners may be driven by power only partially into a surface, with the final advancement of the fasteners being completed by hand. Despite many other advances in relevant technologies, a more reliable and efficient means of installing fasteners has yet to be achieved.

SUMMARY OF THE INVENTION

The present invention provides a reliable, repeatable and efficient method of installing a fastener into a surface without defacement of the surface. The invention is applicable to essentially any fastener of the type having a shank and an enlarged head wherein the head of the fastener must be advanced into adjacent facing relation to the surface without defacement of the surface.

Briefly summarized, the method of the present invention is based upon the use of an annular washer of a viscoelastic material having an inner opening larger than a diametric dimension of the shank and smaller than a diametric dimension of the enlarged head of the fastener, and an outer dimension larger than the diametric dimension of the enlarged head of the fastener. According to the present method, the annular washer is placed on the shank of the fastener in surrounding relation thereto and adjacent the enlarged head of the fastener. The shank of the fastener is then driven into the surface via engagement of a driving tool with the enlarged head of the fastener to advance the enlarged head of the fastener into clamping engagement of the washer between the enlarged head of the fastener and the surface. The fastener is then further driven with sufficient force to cause the enlarged head of the fastener to viscoelastically expand the washer radially outwardly away from the shank of the fastener until the inner opening of the washer expands to approximately the diameteric dimension of the enlarged head of the fastener. In doing so, the interposition of the washer between the driving tool and the surface protects the surface against defacement. Driving of the fastener is then terminated and the washer is removed from its surrounding relation to the fastener. Advantageously, the enlarged head of the fastener is thereby disposed in adjacent facing relation to the surface without defacement thereof.

While various viscoelastic materials are contemplated to be effective for fabrication of the washer, it is believed to be preferable that the washer be made of a synthetic or natural rubber, e.g., a silicone composition. Other suitable viscoelastic materials may include various polymeric, foam and gel materials that exhibit viscoelastic properties to be suitable for use as washers in the present invention.

The relationship between the size of the inner opening of the washer and the diametric dimension of the shank of the fastener is believed to play an important role in the effective execution of the present method. Specifically, it is contemplated that the inner opening of the washer should be at least about 20% larger, and more preferably at least about 25% larger, than the diametric dimension of the shank of the fastener.

The relationship between the outer dimension of the washer and the diametric dimension of the enlarged head of the fastener is also believed to play an important role in the present method. Specifically, it is contemplated that the outer dimension of the washer should be at least about 25% larger, and more preferably at least about 40% larger, than the diametric dimension of the enlarged head of the fastener.

The washer should also have an axial thickness sufficient to resist tearing under the clamping force exerted by the enlarged head of the fastener.

In one embodiment of the invention that has performed effectively in testing, the shank of the fastener has a diameter of about 0.25 inch and the enlarged head of the fastener is hexagonal with a diametric dimension of about 0.5 inch, the inner opening of the washer has a diameter of about 0.32 inch and the outer dimension of the washer has a diameter of about 0.7 inch, and the washer has an axial thickness of about 0.1 inch.

Another aspect of the invention provides a novel form of washer adapted for temporary use in installing a fastener into a surface without defacement of the surface. The washer comprises an annular body of a viscoelastic material having an inner opening, an outer annular edge, and a tapering countersunk annular wall surrounding the inner opening. The annular body of the washer is adapted to viscoelastically expand radially outwardly in response to clamping action by a fastener head when driven into a surface. In a preferred embodiment, the washer includes a radially outwardly projecting tab to facilitate grasping to remove the washer from the fastener.

DETAILED DESCRIPTION OF THE INVENTION

Referring now to the accompanying drawings, the method of installing a fastener according to the present invention is depicted sequentially in FIGS. 1-5. In the depicted illustrations, a threaded fastener 10 is used to attached a common form of angle bracket 12 to a vertical wall W, such as would be utilized to support a shelf or a cantilevered countertop (not shown).

At the outset, it is to be expressly understood that the threaded fastener 10 and the angle bracket 12 in the depicted embodiment are merely illustrative. The fastener 10 is of the type commonly referred to as a screw, having a threaded self-tapping shank 14 terminating in a tapering pointed free end 14A and an enlarged hexagonally shaped head 16. The angle bracket 12 has perpendicularly oriented legs 12A, 12B, formed with holes 12C to receive fasteners such as the fastener 10. However, the method of the present invention is equally applicable to various other forms of fasteners, including other forms of screws such as screws with flat, button, oval, pan and round heads, with slotted, philips, socket, star and other forms of drive surfaces, bolts without any self-tapping ability, rivets, nails, or substantially any other fastener having a shank that penetrates a surface with a head at one end of the shank to be engaged by a driving tool, whether a powered tool or a hand tool. Likewise, the invention is equally adapted to installing fasteners to secure diverse devices, objects and items other than angle brackets and for installing fasteners alone into a surface in environments in which no bracket, device, object or item is being secured.

An annular washer 18 is provided in surrounding relation on the shank 14 of the fastener 10. According to the invention, and in contrast to the conventional known uses of washers, the washer 18 is selected to be made of a material with predetermined viscoelastic characteristics and predetermined dimensional relationships to the fastener 10 to facilitate removal of the washer 18 from the fastener 10 after installation, rather than the washer 18 remaining in situ in the finished installation.

More specifically, a preferred form of the washer 18 is made of a synthetic or natural rubber. Silicone washers have been found in preliminary testing to perform satisfactorily. However, it is contemplated that washers of other viscoelastic materials will behave or can be engineered to behave in the manner described herein. For example, various polymeric, foam and gel materials exhibit viscoelastic properties that could be suitable for use as washers in the present invention. It is presently contemplated that the viscoelastic material should have a durometer hardness in the range of 30 shore A to 80 shore A.

The washer 18 preferably is in the form of a circular disk body 20 with a central axial opening 18A and an outer annular periphery 18B. The central opening 18A should be larger than the diameter of the threaded shank 14 of the fastener 10 so as to slip loosely onto and rest loosely on the shank 14, and can be significantly larger than the threaded shank 14 so long as smaller than the lateral diametric dimension of the enlarged head 16 transversely to the axis of the shank 14. Specifically, it is contemplated that the central opening 18A of the washer 18 should be at least about 20% larger, and more preferably at least about 25% larger, than the diametric dimension of the threaded shank 14 of the fastener 10.

Figure 1:
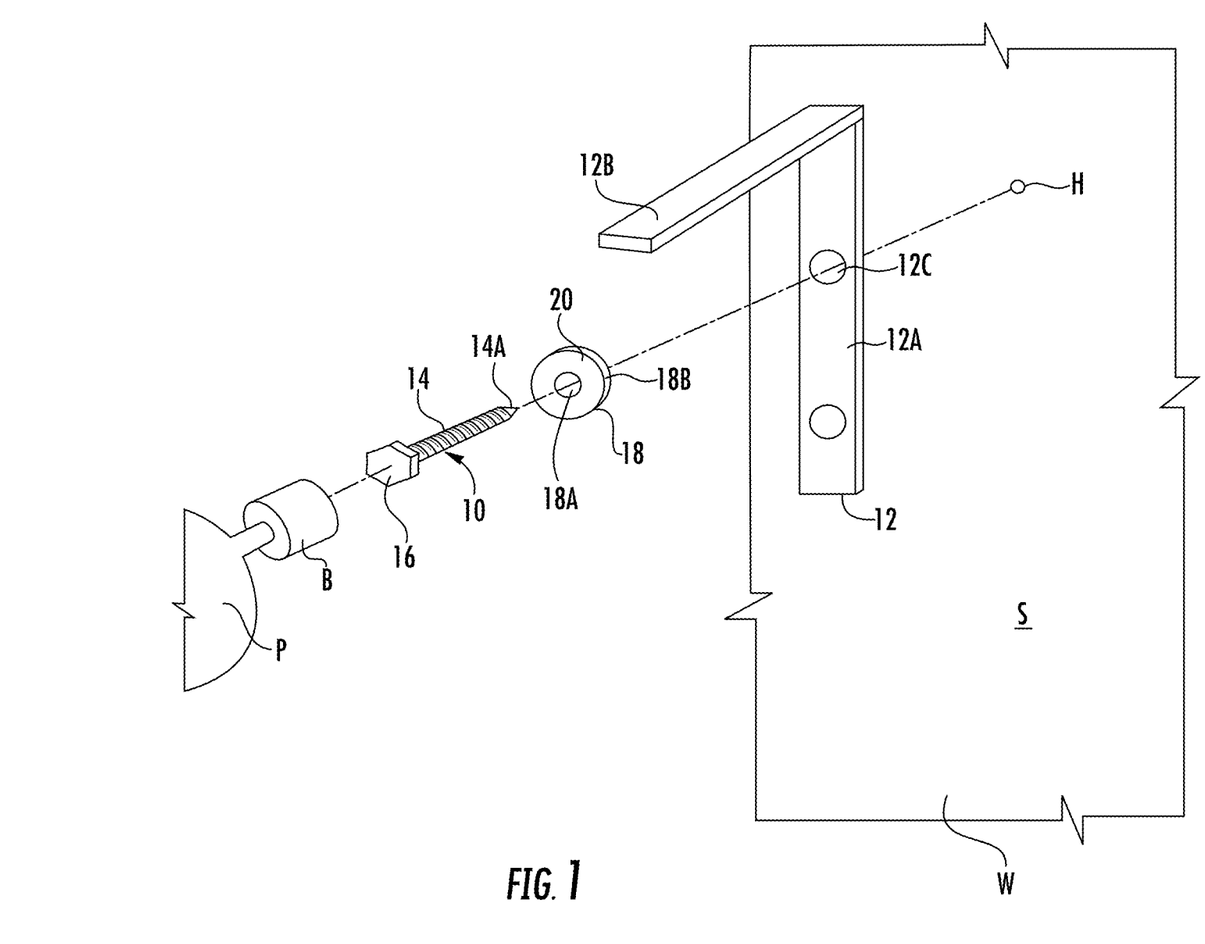
FIGS. 1-5 are perspective views depicting sequential stages of the installation of a fastener according to the method of the present invention.

The washer 18 should also have an outer diameter to its annular periphery 18B that is sufficiently larger than the head 16 of the fastener 10 to be interposed between a powered or like tool used to engage and drive the fastener 10 via its head 16, such as a socket bit B on a power drill as representatively indicated at P in FIG. 1. Specifically, it is contemplated that the outer diameter of the washer 18 should be at least about 25% larger, and more preferably at least about 40% larger, than the diametric dimension of the enlarged head 16 of the fastener 10.

The washer 18 should also have a thickness, i.e., in the axial dimension, sufficient to lend enough structural integrity to the washer to resist splitting, tearing or disintegration when subjected to viscoelastic stretching and expansion in a radially outward direction, such as described hereinafter.

As one representative example, the method of the present invention has been found to perform satisfactorily in the driving of screws with a threaded shank of a 0.25 inch diameter and a 0.5 inch hexagonal head, using silicone washers having a 0.7 inch outer diameter, 0.32 inch diameter inner opening, and 0.1 inch thickness. Suitable washers are manufactured by Dream Industrial Products Co., of Zhejiang, China.

Figure 2:
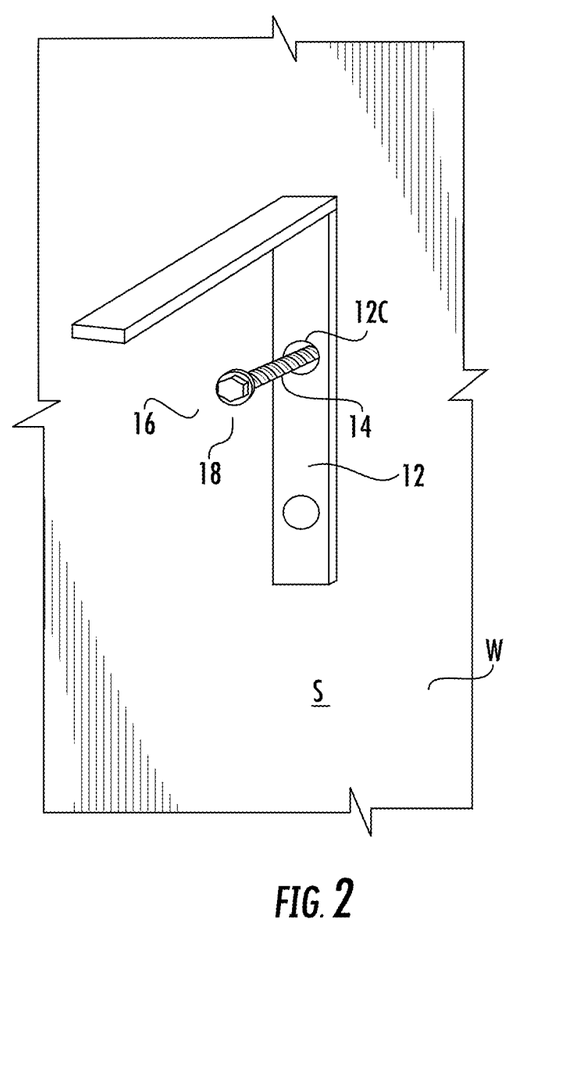

The performance of the method of the present invention may thus be understood with reference to FIGS. 1-5 of the drawings in which stages in the methodology are depicted sequentially in the driving of the threaded fastener 10 through a hole in the angle bracket 12 and into a hole H pre-drilled into the surface S of the wall W. FIG. 1 depicts the relevant components in exploded view preparatory to beginning the installation. The shank 14 of the fastener 10 is initially inserted through the central opening 18A of the washer 18 whereby the washer 18 rests loosely on the shank 14 and against the underside of the head 16 of the fastener 10. The bracket 12 is manually placed against the surface S of the wall W with the hole 12C in the bracket aligned with the hole H in the wall W, the head 16 of the fastener 10 is placed in the drive bit of the powered tool P, and then the tool P is positioned to insert the tip 14A of the shank 14 into the aligned holes 12C, H, as depicted in FIG. 2. For sake of clarity in illustration of the action of the fastener 10 and washer 18 in FIGS. 2-5, the power tool P is not shown.

Figure 3:
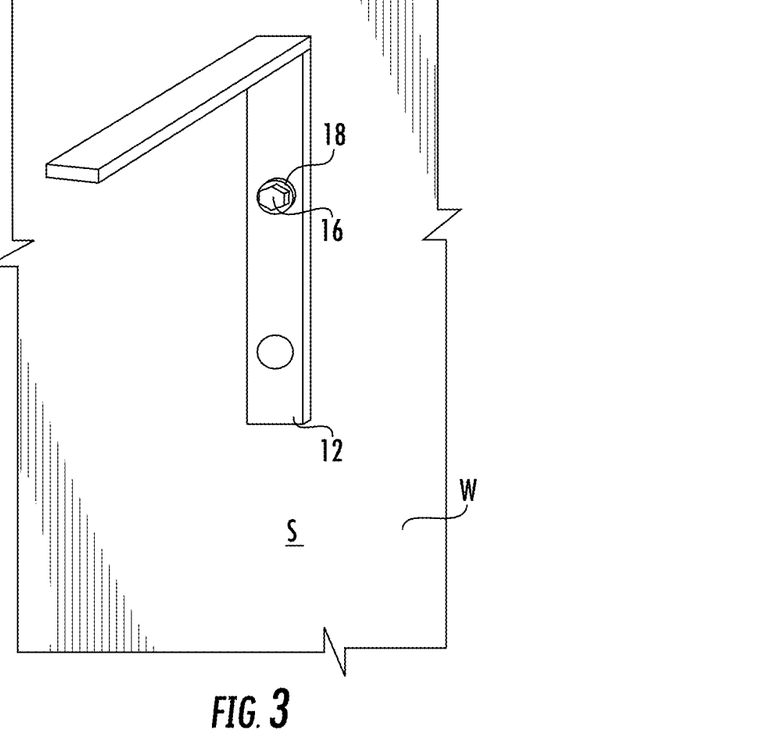
Figure 4:
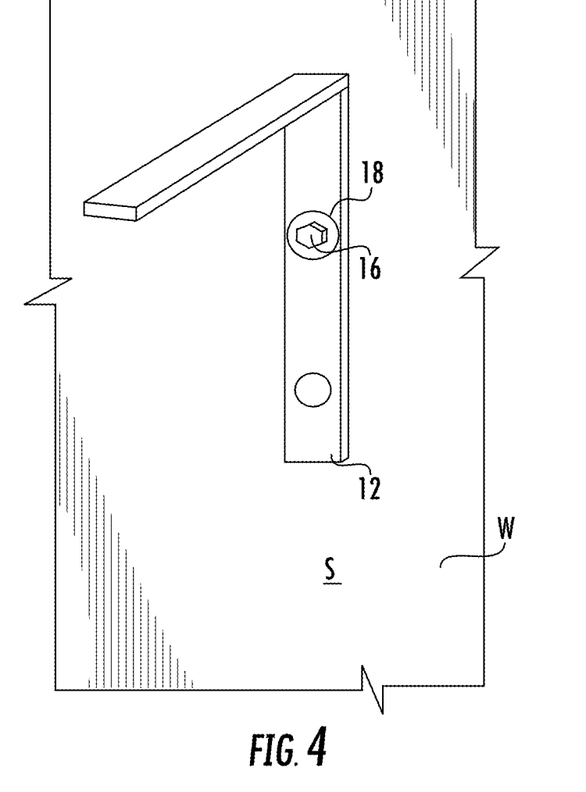
Figure 5:
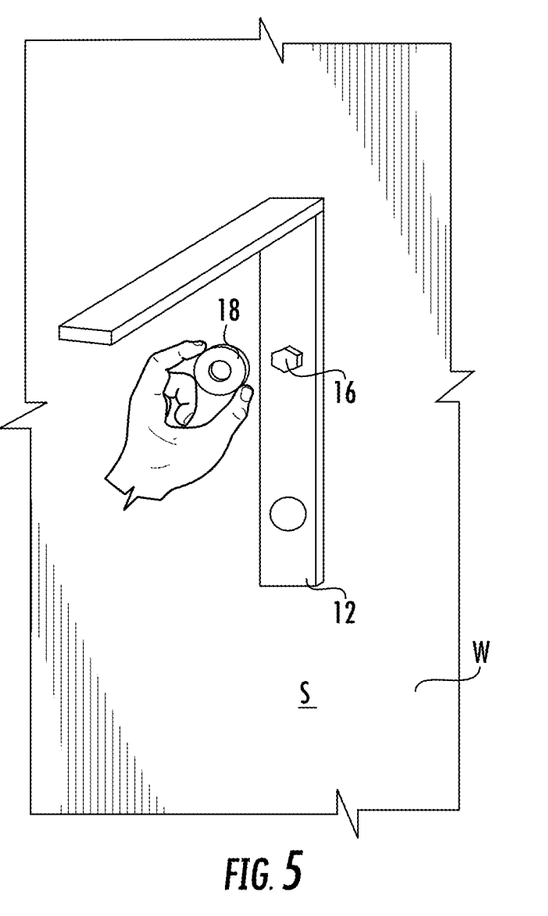

Upon actuation of the tool P, the fastener 10 is rotationally driven to advance progressively into the pre-drilled hole H in the wall W. As the enlarged head 16 of the fastener 10 approaches the bracket 12, the head 16 begins to clamp the washer 18 against the outwardly facing surface of the bracket 12, as depicted in FIG. 3. As the fastener 10 advances further the washer 18 viscoelastically yields to the clamping action of the fastener head 16 causing the washer to compress and flow radially outwardly away from the shank 14 and outwardly from the fastener head 16, to the point that the central opening 18A of the washer 18 has expanded to approximately the diametric dimension of the fastener head 16, as depicted in FIG. 4. The washer 18 may then be manually removed from the fastener 10 over the head 16, leaving the fastener 10 in a tightened state against the angle bracket 12, but in the process the interposition of the washer 18 between the drive bit B of the power tool P and the bracket 12 protects the bracket 12 from becoming marred or otherwise defaced.

The advantages of the method of the present invention may this be understood. Fasteners in virtually any application can be quickly driven into place in any surface using power tools without special preparations, steps or skill required to protect the surface. Using the method of the present invention will therefore optimize the speed of driving fasteners into place, with significantly lessened risk of damage to components, enabling work crews to operate more efficiently and profitably.

Figure 6:
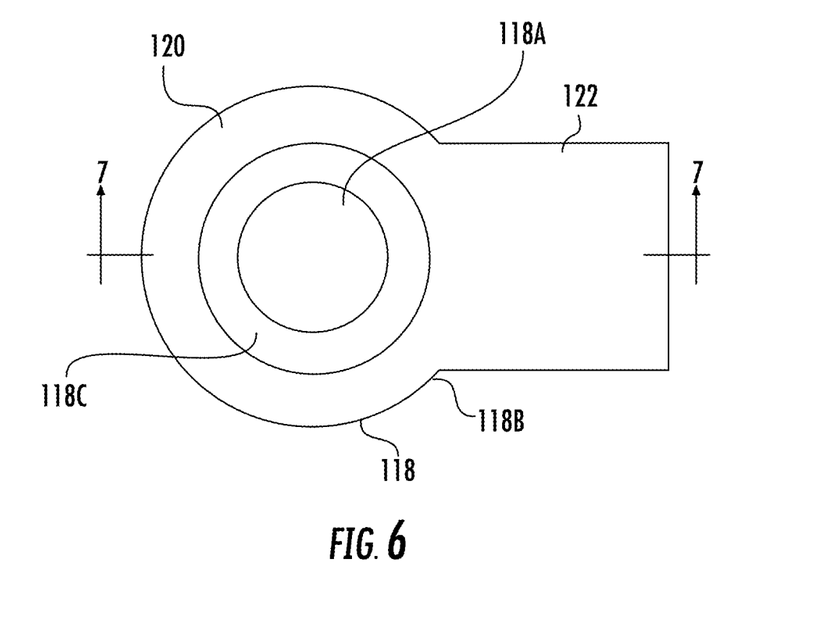
FIG. 6 is a top plan view of a washer particularly adapted for use in the method of the present invention.
Figure 7:
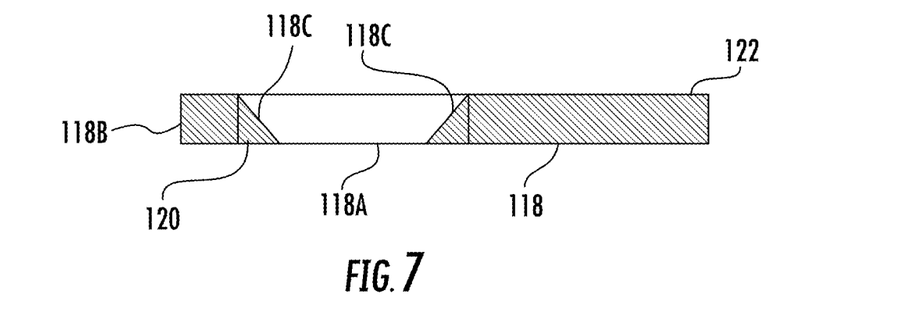
FIG. 7 is a diametric cross-sectional view of the washer of FIG. 5, taken along line 7-7 thereof.

Referring now to FIGS. 6 and 7, an alternative form of washer is depicted at 118 which is particularly adapted for use in performing the method of the present invention. The washer 118 comprises an annular body 120 of a viscoelastic material having an inner opening 118A, an outer annular periphery 118B, and a tapering countersunk annular wall surrounding the inner opening 118C. Owing to the countersunk configuration of the washer body 120, the washer body 120 is especially adapted to viscoelastically expand radially outwardly in response to clamping action by a fastener head 16 when the fastener is driven into a surface. Optionally, but preferably, the washer 118 includes a tab portion 122 which projects radially outwardly from the outer annular periphery 118B to provide a convenient portion that may be manually grasped to remove the washer from surrounding relation to the fastener after driving installation of the fastener has viscoelastically expanded the washer.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A method of installing a fastener of the type having a shank and an enlarged head into a surface wherein the head of the fastener is advanced into adjacent facing relation to the surface without defacement of the surface, the method comprising the steps of:
   selecting an annular washer of a viscoelastic material having an inner opening at least 20% larger than a diametric dimension of the shank of the fastener and smaller than a diametric dimension of the enlarged head of the fastener and an outer dimension larger than the diametric dimension of the enlarged head of the fastener,
   placing the annular washer on the shank of the fastener in surrounding relation thereto and adjacent the enlarged head of the fastener,
   driving the shank of the fastener into the surface via engagement of a driving tool with the enlarged head of the fastener to advance the enlarged head of the fastener into clamping engagement of the washer between the enlarged head of the fastener and the surface,
   continuing driving of the fastener with sufficient force to cause the enlarged head of the fastener to viscoelastically expand the washer radially outwardly away from the shank of the fastener until the inner opening of the washer expands to approximately the diametric dimension of the enlarged head of the fastener, wherein the interposition of the washer between the driving tool and the surface protects the surface against defacement,
   then terminating further driving of the fastener and removing the washer from surrounding relation to the fastener,
   whereby the enlarged head of the fastener is disposed in adjacent facing relation to the surface without defacement thereof.

2. The method of installing a fastener into a surface without defacement of the surface according to claim 1, wherein the viscoelastic material of the washer is a synthetic or natural rubber.

3. The method of installing a fastener into a surface without defacement of the surface according to claim 2, wherein the viscoelastic material of the washer is a silicone composition.

4. The method of installing a fastener into a surface without defacement of the surface according to claim 1, wherein the inner opening of the washer is at least 25% larger than the diametric dimension of the shank of the fastener.

5. The method of installing a fastener into a surface without defacement of the surface according to claim 1, wherein the washer comprises a tapering countersunk annular wall surrounding the inner opening.

6. The method of installing a fastener into a surface without defacement of the surface according to claim 1, wherein the washer includes a radially outwardly projecting tab for grasping to remove the washer from the fastener.

7. A method of installing a fastener of the type having a shank and an enlarged head into a surface wherein the head of the fastener is advanced into adjacent facing relation to the surface without defacement of the surface, the method comprising the steps of:
   selecting an annular washer of a viscoelastic material having an inner opening larger than a diametric dimension of the shank and smaller than a diametric dimension of the enlarged head of the fastener and an outer dimension larger than the diametric dimension of the enlarged head of the fastener, wherein the outer dimension of the washer is at least 25% larger than the diametric dimension of the enlarged head of the fastener,
   placing the annular washer on the shank of the fastener in surrounding relation thereto and adjacent the enlarged head of the fastener,
   driving the shank of the fastener into the surface via engagement of a driving tool with the enlarged head of the fastener to advance the enlarged head of the fastener into clamping engagement of the washer between the enlarged head of the fastener and the surface,
   continuing driving of the fastener with sufficient force to cause the enlarged head of the fastener to viscoelastically expand the washer radially outwardly away from the shank of the fastener until the inner opening of the washer expands to approximately the diametric dimension of the enlarged head of the fastener, wherein the interposition of the washer between the driving tool and the surface protects the surface against defacement,
   then terminating further driving of the fastener and removing the washer from surrounding relation to the fastener,
   whereby the enlarged head of the fastener is disposed in adjacent facing relation to the surface without defacement thereof.

8. The method of installing a fastener into a surface without defacement of the surface according to claim 7, wherein the outer dimension of the washer is at least 40% larger than the diametric dimension of the enlarged head of the fastener.

9. The method of installing a fastener into a surface without defacement of the surface according to claim 7, wherein the washer comprises a tapering countersunk annular wall surrounding the inner opening.

10. The method of installing a fastener into a surface without defacement of the surface according to claim 7, wherein the washer includes a radially outwardly projecting tab for grasping to remove the washer from the fastener.

11. A method of installing a fastener of the type having a shank and an enlarged head into a surface wherein the head of the fastener is advanced into adjacent facing relation to the surface without defacement of the surface, the method comprising the steps of:
- selecting an annular washer of a viscoelastic material having an inner opening larger than a diametric dimension of the shank and smaller than a diametric dimension of the enlarged head of the fastener and an outer dimension larger than the diametric dimension of the enlarged head of the fastener, wherein the washer has an axial thickness sufficient to resist tearing under the clamping force exerted by the enlarged head of the fastener,
- placing the annular washer on the shank of the fastener in surrounding relation thereto and adjacent the enlarged head of the fastener,
- driving the shank of the fastener into the surface via engagement of a driving tool with the enlarged head of the fastener to advance the enlarged head of the fastener into clamping engagement of the washer between the enlarged head of the fastener and the surface,
- continuing driving of the fastener with sufficient force to cause the enlarged head of the fastener to viscoelastically expand the washer radially outwardly away from the shank of the fastener until the inner opening of the washer expands to approximately the diametric dimension of the enlarged head of the fastener, wherein the interposition of the washer between the driving tool and the surface protects the surface against defacement,
- then terminating further driving of the fastener and removing the washer from surrounding relation to the fastener,
- whereby the enlarged head of the fastener is disposed in adjacent facing relation to the surface without defacement thereof.

12. The method of installing a fastener into a surface without defacement of the surface according to claim 11, wherein the washer comprises a tapering countersunk annular wall surrounding the inner opening.

13. The method of installing a fastener into a surface without defacement of the surface according to claim 11, wherein the washer includes a radially outwardly projecting tab for grasping to remove the washer from the fastener.

14. A method of installing a fastener of the type having a shank and an enlarged head into a surface wherein the head of the fastener is advanced into adjacent facing relation to the surface without defacement of the surface, the method comprising the steps of:
- selecting an annular washer of a viscoelastic material having an inner opening larger than a diametric dimension of the shank and smaller than a diametric dimension of the enlarged head of the fastener and an outer dimension larger than the diametric dimension of the enlarged head of the fastener,
- placing the annular washer on the shank of the fastener in surrounding relation thereto and adjacent the enlarged head of the fastener,
- driving the shank of the fastener into the surface via engagement of a driving tool with the enlarged head of the fastener to advance the enlarged head of the fastener into clamping engagement of the washer between the enlarged head of the fastener and the surface,
- continuing driving of the fastener with sufficient force to cause the enlarged head of the fastener to viscoelastically expand the washer radially outwardly away from the shank of the fastener until the inner opening of the washer expands to approximately the diametric dimension of the enlarged head of the fastener, wherein the interposition of the washer between the driving tool and the surface protects the surface against defacement,
- then terminating further driving of the fastener and removing the washer from surrounding relation to the fastener,
- whereby the enlarged head of the fastener is disposed in adjacent facing relation to the surface without defacement thereof,
- wherein the shank of the fastener has a diameter of 0.25 inch and the enlarged head of the fastener is hexagonal with a diametric dimension of 0.5 inch, the inner opening of the washer has a diameter of 0.32 inch and the outer dimension of the washer has a diameter of 0.7 inch, and the washer has an axial thickness of 0.1 inch.

15. The method of installing a fastener into a surface without defacement of the surface according to claim 14, wherein the washer comprises a tapering countersunk annular wall surrounding the inner opening.

16. The method of installing a fastener into a surface without defacement of the surface according to claim 14, wherein the washer includes a radially outwardly projecting tab for grasping to remove the washer from the fastener.

* * * * *